United States Patent Office 3,334,708
Patented Aug. 8, 1967

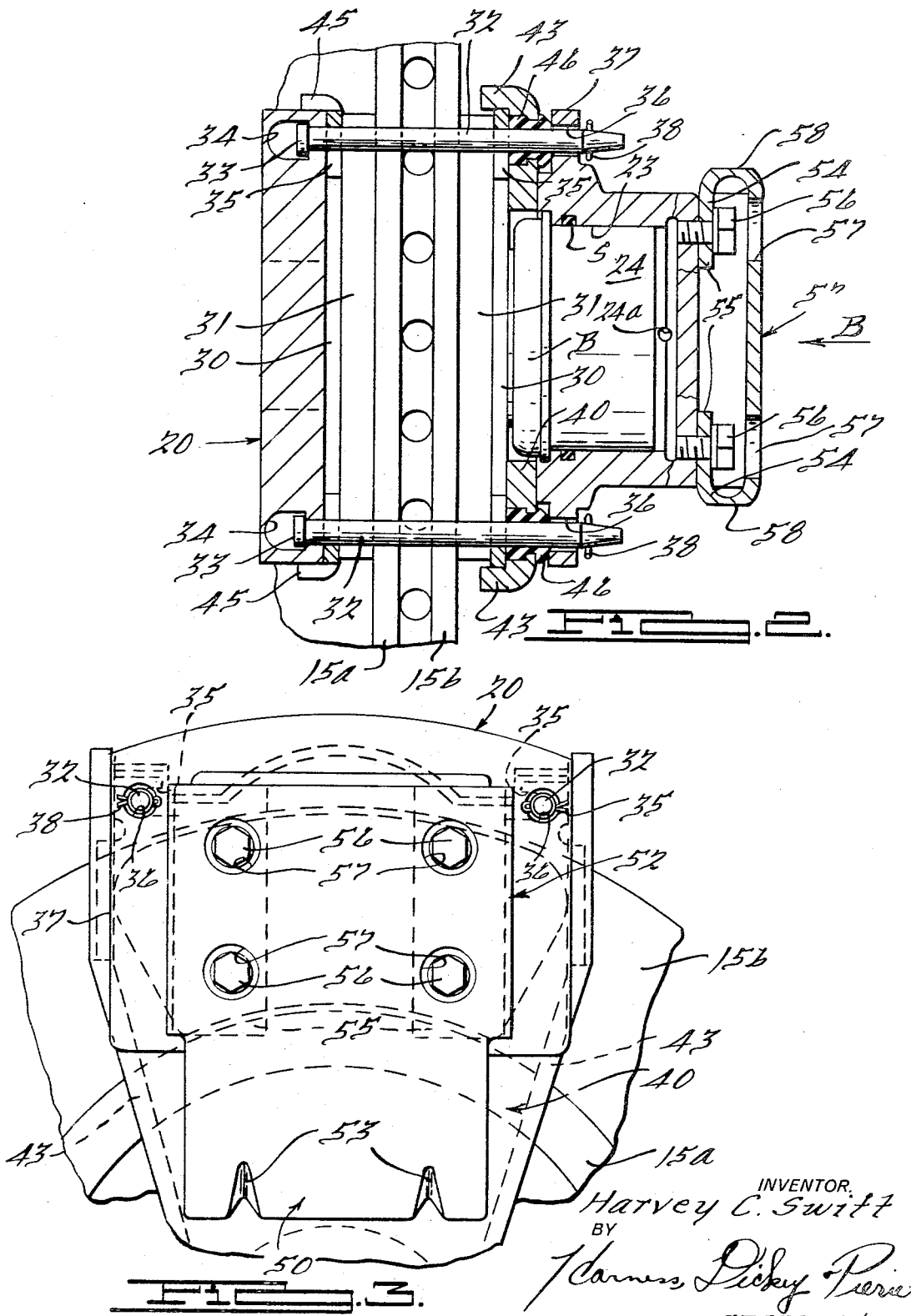

3,334,708
SPOT-TYPE DISK BRAKE
Harvey C. Swift, Birmingham, Mich., assignor to Kelsey-Hayes Company, Romulus, Mich., a corporation of Delaware
Filed Jan. 5, 1966, Ser. No. 518,805
4 Claims. (Cl. 188—73)

ABSTRACT OF THE DISCLOSURE

This application discloses a disk brake assembly in which the caliper is supported upon a strap-like member that has two cantilevered projections which are fixed to the caliper. Actuation of the brake shoes associated with the caliper will cause sliding movement of the caliper which movement is accommodated by the cantilever deflection of the projections.

---

This invention relates to brakes for vehicles and, more particularly, to improvements therein tending to simplify, render the same efficient, and improve the same generally.

One of the objects of the invention is to provide a disk brake provided with a structure whereby the force applying means moves parallel to the face of the rotor to apply the braking force.

Another object of the invention is to provide a brake construction in which the caliper or yoke member is slidably supported on a torque member for movement toward and from the brake shoes and in which the caliper is further supported by a second strap-like member having two horizontally spaced resilient attaching portions connected to the caliper.

The invention comprises broadly the combination of means for resisting the torque forces on the caliper and brake shoes while permitting the caliper and brake shoes to move at right angles to the plane of the brake disk to effect actuation of the brake shoes.

Other objects of the invention are to provide a simplified form of disk brake which may be economically manufactured; which may be quickly and easily assembled and installed; and in which maintenance costs are reduced to a minimum.

The various objects and advantages, and the novel details of construction of one commercially practical embodiment of the invention, will become more apparent as this description proceeds, especially when considered in connection with the accompanying drawings, in which:

FIGURE 2 is a fragmentary sectional view taken substantially on the plane indicated by line A—A in FIGURE 1; and FIGURE 3 is an elevational view looking in the direction of the arrow B in FIGURE 2.

Figure 1:
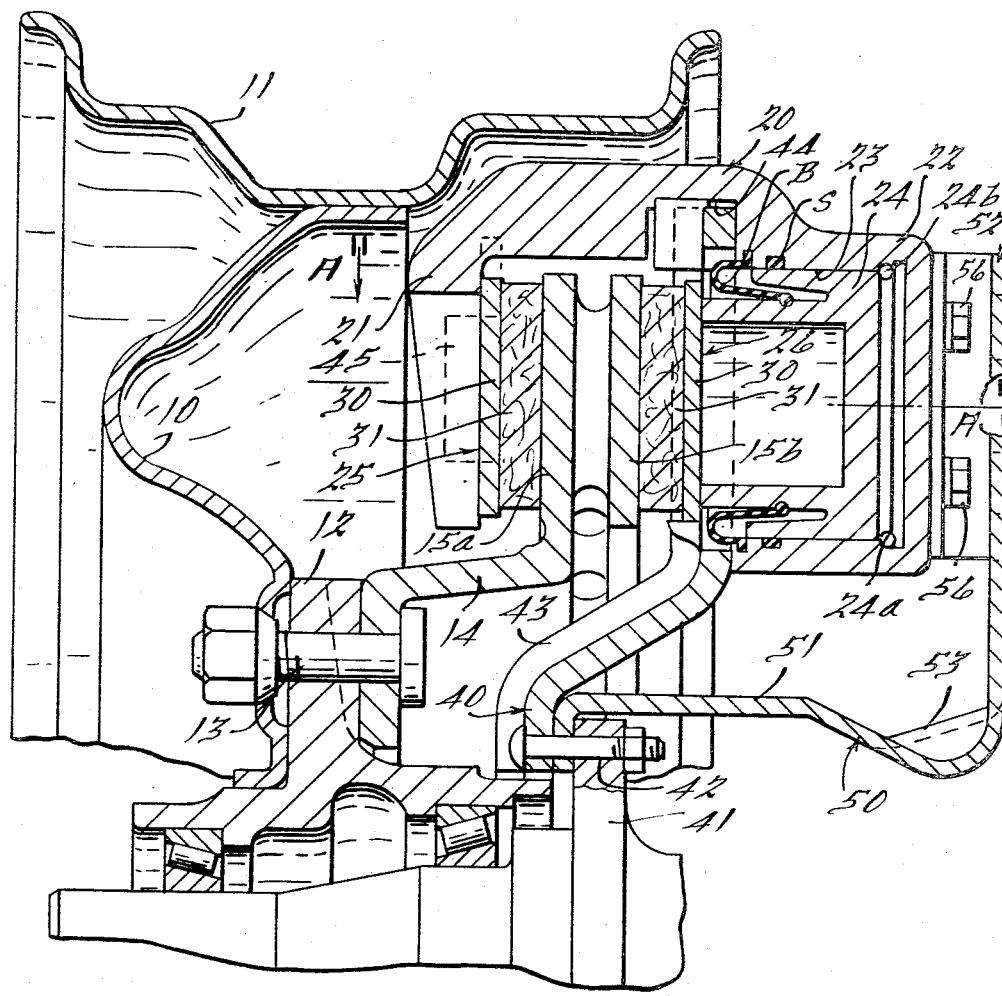
FIGURE 1 is a fragmentary vertical sectional view through a disk brake constructed in accordance with this invention.

The brake of this invention is shown as being associated with a vehicle wheel body 10 carrying a rim 11. The wheel body is secured to the axle flange 12 by means of studs or bolt and nut assemblies 13. Also secured to the axle flange 12, as for instance by means of the same stud or bolt and nut assemblies 13, for rotation with the wheel 10, is a brake disk 14. The brake disk 14 is of the ventilated type having spaced walls 15a and 15b.

The reference character 20 indicates a caliper-like housing or member having a leg 21 engaging one of the brake shoes. The other leg 22 of the caliper member is provided with a cylindrical recess 23 forming a cylinder to slidably receive a piston 24. Fluid under pressure is admitted to the cylinder 23 through an inlet passage 24a behind the piston 24. The reference character 24b indicates a bleed opening. The piston 24 is provided with an annular seal S and a boot B is provided between the piston 24 and the cylinder 23. When fluid under pressure is admitted to the cylinder 23, the piston 24 is moved to the left, as viewed in FIGURE 1, and engages the adjacent brake shoe to move it against the brake disk. The reaction of this movement of the piston operates in an opposite direction to move the caliper 20 to the right so that the leg 21 thereof moves the other brake shoe into engagement with the brake disk. Thus, both brake shoes are actuated simultaneously by the use of a single piston.

The reference character 25 indicates one brake shoe and the reference character 26 indicates the other brake shoe. Each brake shoe consists of a backing plate 30 carrying a friction lining 31 adapted to engage the braking surfaces 15a and 15b of the brake disk 14.

The brake shoes are slidably supported on a pair of pins or rods 32. These rods 32 are each provided with a head 33 at one end which engages an aperture 34 in the caliper 20. The rods 32 pass through open ended slots 35 formed in the backing plates 30 of the brake shoes and the free ends of the rods 32 extend through apertures 36 formed in ears 37 projecting from the caliper member 20. The end of each rod 32 is provided with a cotter pin or the like 38 which prevents its accidental removal.

The reference character 40 indicates a torque member secured at one end to a fixed axle part 41 by means of studs or nuts and bolts 42. The torque member 40 is provided at each lateral edge thereof with a flange 43. The upper end of the torque member 40 extends into a recess 44 formed in the caliper member 20. This recess is of sufficient length to permit movement of the caliper 20 when the brakes are applied.

The flanges 43 on the torque member 40 engage the corresponding edges of the backing plate 30 of the brake shoe 26 at the right, as viewed in FIGURE 2, and the side edges of the other backing plate 30 of the other brake shoe are provided with laterally extending flanges 45 (FIGURE 2) which engage the adjacent portion of the caliper. These laterally extending flanges 43 and 45 prevent displacement of the brake shoes.

Bushings 46 surround the pins or rods 32 at the points where they pass through the torque member 40, as shown in FIGURE 2.

With the construction thus far described, it will be noted that the brake shoes are supported on the pins or rods 32 and are movable thereon when the brakes are applied or released.

The caliper 20 is floatingly mounted for restrained movement in the direction of the axis of the wheel by means of a member 50, which is a substantially strap-like member secured at its one end to the stationary axle part 41 by means of the stud or bolt and nut assemblies 42. The member 50 has a substantially horizontal portion 51 and a vertically extending portion 52, the end of which is in horizontal alignment with the caliper 20. The strap-like member 50 may be provided with stiffening ribs 53, if desired. The upper free end 52 of the strap-like member 50 is bent or shaped to provide two spaced opposed return-bent portions 54 providing a pair of aligned flanges 55. The flanges 55 are secured by bolts or the like 56 to the end of the caliper. The free end 52 of the strap-like member is provided with apertures 57 aligned with the fastening elements 56 so that these elements may be accessible to secure the same in place on the caliper member.

If desired, the metal in the bends which connect the flanges 55 to the body of the member 50 may be thinned or weakened as at 58 to facilitate movement of the caliper 20 when the brakes are applied.

Therefore, the strap-like member 50 supports the caliper for movement when the brakes are applied or released and the return-bent portions 54 permit the necessary movement of the caliper toward and away from the brake disk.

The structure just described provides a simple and readily accessible means for controlling the movement of the caliper 20 when the brakes are applied or released. It will be understood that when the caliper 20 moves to the right, as viewed in FIGURE 1, the flanges 55 will also move to the right by reason of the return bends 54 and that upon release of the brakes, the caliper member will be moved to the left, to the normal position illustrated in the drawings, by reason of the resiliency of the return bends 54.

The construction heretofore described provides a very efficient disk brake which is so reduced in the the number and character of its component parts as to approach the ultimate in structural simplicity to thereby create an economy in its manufacture, installation and maintenance costs.

While one commercially practical embodiment of the invention has been described and illustrated herein somewhat in detail, it will be understood that various changes may be made as may come within the purview of the accompanying claims.

What is claimed is:

1. A disk brake for a wheel supported for rotation with respect to a stationary member comprising a brake disk fixed for rotation with the wheel, a caliper straddling at least a portion of the periphery of said brake disk, a pair of opposed brake shoes associated with said caliper and adapted to engage oppositely facing radially extending surfaces of said brake disk, a brake actuating piston carried by said caliper for actuating one of said brake shoes directly and for actuating the other brake shoe through said caliper, a supporting member for supporting said caliper and for providing a torque reaction therefor, said supporting member having a first part fixed against rotation relative to said stationary member and a second part juxtaposed to said caliper, a pair of parallel offset portions extending in cantilever fashion from said second part and substantially parallel to one of said disk brake surfaces, and means for affixing said offset portions to said caliper for cantilever deflection of said offset portions upon actuating of said brake shoes.

2. A disk brake as set forth in claim 1 wherein the offset portions are spaced apart and extend toward each other.

3. A disk brake as set forth in claim 2 wherein the offset portions are connected to the second part of the supporting member by a weakened section for facilitating cantilever deflection thereof.

4. A disk brake as set forth in claim 1 wherein the supporting member first part is connected to the second part by a section that extends substantially normal to the disk brake surface and normal to said first and said second parts.

References Cited

UNITED STATES PATENTS

| 3,035,664 | 5/1962 | Desvignes et al. | 188—73 |
| 3,090,468 | 5/1963 | Von Rucker | 188—73 |
| 3,258,089 | 6/1966 | Hayes et al. | 188—73 |

FOREIGN PATENTS

| 1,379,032 | 10/1964 | France. |
| 926,992 | 5/1963 | Great Britain. |

MILTON BUCHLER, *Primary Examiner.*

G. E. A. HALVOSA, *Assistant Examiner.*